March 2, 1965     R. R. MANDY     3,171,333
PUMP FOR WINDSHIELD WASHING SYSTEM

Filed Dec. 31, 1962     2 Sheets-Sheet 1

INVENTOR.
ROBERT R. MANDY
BY Rudolph L. Lowell
ATTORNEY.

March 2, 1965 R. R. MANDY 3,171,333
PUMP FOR WINDSHIELD WASHING SYSTEM
Filed Dec. 31, 1962 2 Sheets-Sheet 2
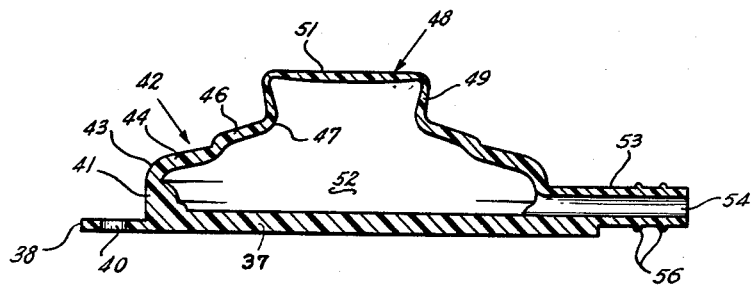
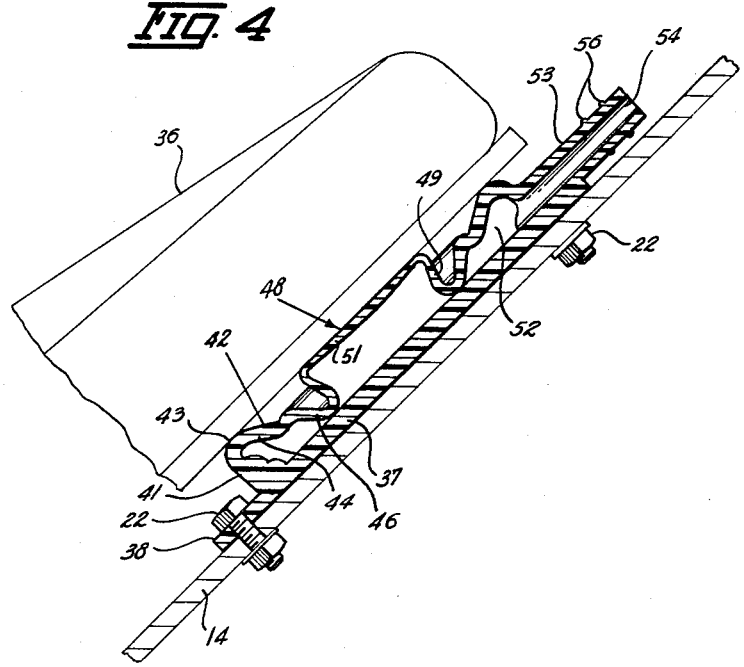
INVENTOR.
ROBERT R. MANDY
BY
ATTORNEY.

United States Patent Office

3,171,333
Patented Mar. 2, 1965

3,171,333
PUMP FOR WINDSHIELD WASHING SYSTEM
Robert R. Mandy, Detroit, Mich., assignor to The Delman Company, Cookeville, Tenn., a corporation of Tennessee
Filed Dec. 31, 1962, Ser. No. 248,321
2 Claims. (Cl. 92—92)

The present invention relates to vehicle windshield washing systems and more particularly to an operator actuated motor vehicle windshield washing system having a unitary foot-operated bellows pump.

An object of this invention is to provide an improved foot-operated bellows pump.

Another object of the invention is to provide for use in a windshield washing system a rugged, one-piece, flexible plastic foot-operated pump having a resilient top wall contoured to minimize stress points and including an actuating portion for distributing the forces supplied to the top wall to uniformly deform the top wall.

Another object of the invention is to provide a simplified windshield washing system constructed from a minimum number of separate structural parts and which is substantially free of maintenance requirements.

A further object of the invention is to provide a windshield washing system with a one-piece foot-operated bellows pump which is conveniently operated and efficient in operation to force fluid under pressure through the system.

Still another object of the invention is to provide in a windshield washing system a one-piece, flexible plastic and foot-operated bellows pump which resists corrosion and chemicals.

An additional object of the present invention is to provide a compact, reliable and readily installed windshield washing system which is rugged in construction and economical to manufacture.

According to the invention, the windshield washing system for a motor vehicle includes a reservoir carried by the vehicle for storing windshield washing and cleaning fluids, a unitary bellows pump, a nozzle secured to the vehicle and adapted to direct streams of washing fluid toward the windshield, and a pair of check valves controlling the flow of fluid from a reservoir to the pump and from the pump to the nozzle. The check valve interconnects the reservoir with the pump and the pump with the nozzle and permits the flow of fluid from the reservoir into the pump and upon operation of the pump permits the flow of fluid from the pump to the nozzle. The pump is operable in response to pressure applied by the operator to force cleaning fluid normally confined within the pump out of the pump and through the valve to the nozzle. The pump is a one-piece hollow unit having a single fluid passage means and a contoured, convex-shaped resilient top wall having an inverted cup-shaped knob extended outwardly therefrom. The application of manual pressure to the knob uniformly deforms the top wall to force fluid under pressure through the windshield washing system.

The exact nature of the invention as well as other objects and advantages thereof will be readily apparent from a consideration of the following specification relating to the annexed drawing in which:

FIG. 3 is a sectional view of the bellows pump taken along the line 3—3 of FIG. 2; and FIG. 4 is a sectional view illustrated similarly to FIG. 3 showing the bellows pump in assembly position and in a collapsed or fluid emptying position.

Figure 1:
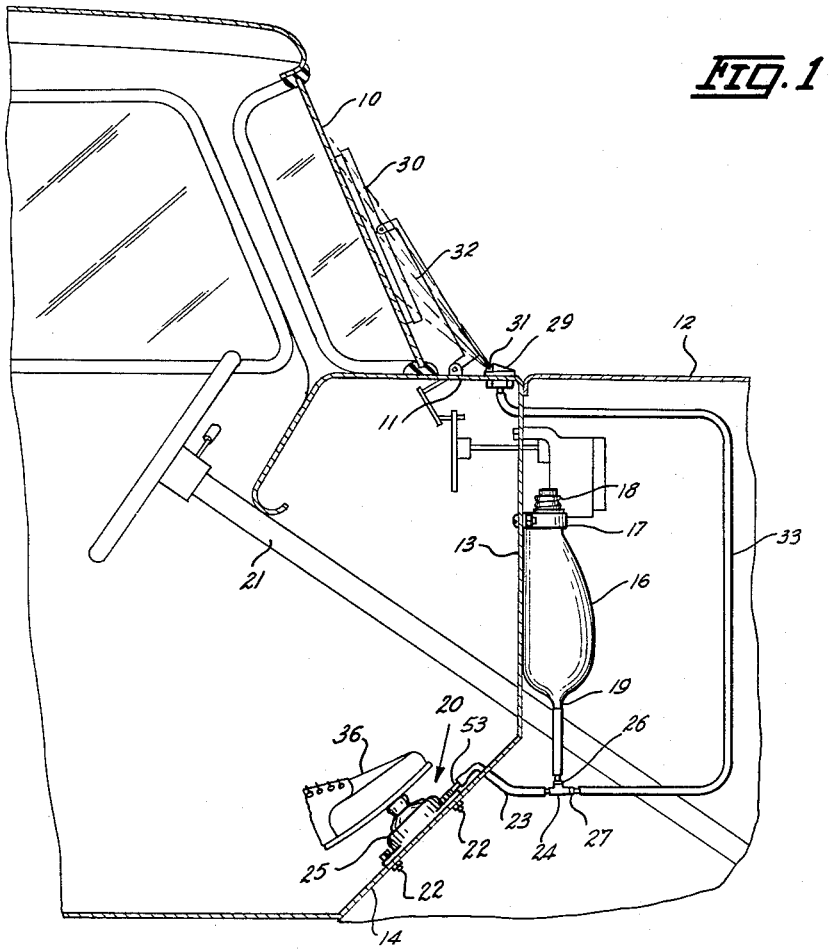
FIG. 1 is an elevation view partly in section of a portion of a motor vehicle showing a windshield washing system including the foot-operated bellows pump of this invention.

With reference to the drawing, there is illustrated in FIG. 1 a windshield clearing system in combination with an automobile having a windshield 10, an engine cowl 11 and an engine hood 12, positioned forwardly of the cowl. Extending downwardly from the cowl 11 is the usual fire wall 13 and the forwardly inclined toe board section 14 which is secured to the lower edge of the fire wall 13.

The windshield washing system includes a reservoir means 16 which is secured to the front side of the fire wall 13 by means of a support 17 fastened to the fire wall. The reservoir 16 contains a fill inlet 18 adjacent the top portion thereof to permit the replenishment of the washing fluid. The washing fluid flows from the reservoir 16 through the outlet passage 19 which is an integral part of the bottom of the reservoir.

The foot-operated bellows pump 20 of this invention is fastened to the toe board section 14 adjacent the automobile steering column 21 by means of bolts 22. The pump 20 is connected by means of a flexible hose 23 into a T-coupling 24 having a pair of check valves 26 and 27. The check valve 26 is connected by a tube 25 to the reservoir outlet passage 19 and functions to permit a flow of fluid from the reservoir 16 to the pump 20 and prevents a flow of fluid from the pump back to the reservoir.

Nozzle means 29, which may be a single nozzle or plurality of nozzles, are supported on the cowl 11 and contain openings 31 for directing streams of fluid 32 onto the windshield 10 and into the path of movement of the usual windshield wipers 30. The nozzle means 29 is fluidly connected by means of a flexible hose 33 to the check valve 27 which functions to permit the flow of fluid from the pump 20 to the nozzle 29 and prevents a flow of fluid from the nozzle to the pump.

In the operation of the washing system the pump 20 is normally filled with a supply of washing fluid, and the operator of the vehicle uses his foot 36 to apply a force to the pump 20 thereby establishing a hydrostatic pressure buildup within the pump for forcing fluid under pressure from the pump through the flexible hose 23 into the T-coupling 24 through the check valve 27 and out of nozzle means 29 onto the windshield 10. The check valve 26 prevents the flow of fluid from the pump 20 into the reservoir 16.

When the operator removes his foot 36 from the pump 20, the deformed pump will return to its normal shape thereby creating a vacuum force which draws liquid through the check valve 26 from the reservoir 16 into the pump body. The check valve 27 prevents the flow of fluid from the nozzle means 29 back into the pump 20 thereby preventing the accumulation of air within the pump 20 and maintaining a supply of washing fluid in the flexible hose 33. The fluid which is normally present in the flexible hose 33 is discharged through the nozzle means 29 in response to the first pumping stroke of the pump 20.

Figure 2:
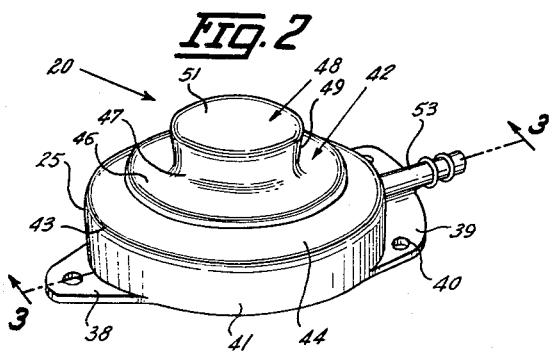
FIG. 2 is an enlarged perspective view of the unitary foot-operated bellows pump of this invention.

Referring to FIGS. 2 and 3, the pump 20 is comprised of a one-piece body 25 which has the characteristics of being tough, elastic, flexible and of high impact strength. The body 25 may be formed from a thermosetting or thermoplastic material such as polyethylene, acrylate and methacrylate resins. In order to secure the pump to the toe board section of the vehicle the body 25 is provided with a flat base wall 37 having integral lateral projections 38 and 39 each having a hole 40 adapted to receive fastening bolts 22. An annular wall 41 is integrally secured to the outer peripheral portion of the base wall 37 and extends upwardly normal to the surface of the base wall.

Integrally formed with the top edge 43 of the annular wall 41 is a generally outwardly convex curved resilient top wall 42 having concentric annular stepped sections 44 and 46. The annular stepped sections 44 and 46 are curved upwardly away from the base wall 37 and extend inwardly from the annular wall 41. The section 46 terminates in an inner circular peripheral edge 47. Integrally formed with the peripheral edge 47 is an inverted cup-shaped knob or actuating portion 48 having a cylindrical side wall 49 extending upwardly substantially normal to the base 37 a distance substantially equal to the upward extent of the side wall 41. A flat top wall 51 integrally joins the cylindrical side wall 49 to form a fluid chamber 52 with the bottom wall 37, side wall 41 and top wall 42.

In order to distribute the working stress equally and increase the fatigue life of the deformed sections of the pump side wall 41 and top wall 42 have a thickness which decreases as a function of the outward distance from the base wall 37. The walls 41 and 42 taper toward the central axis of the pump and have a gradual reduction in thickness over the extent thereof.

The tube 53 is integrally secured to the side wall 41 and the projection 39 and provides the fluid chamber 52 with a fluid communicating passage 54 which projects laterally from the wall 41 beyond the edge of the base portion 39. The outer end of the tube 53 contains a pair of spaced annular ridges 56 which project radially outward. The flexible hose 23, shown in FIG. 1, telescopes over the outer end of the tube 48 and cooperates with the annular ridges 56 to couple the hose 23 with the tube in a fluid sealing relationship.

As shown in FIG. 4, the application of a working force by means of the foot 36 to the actuating portion 48 deforms the top wall 42 moving it toward the base wall 37. The cylindrical wall 49 of the actuating portion 48 annularly distributes the working force to the top wall section 46. The cylindrical wall 49 being disposed substantially parallel to the direction of the application of the working force by the foot 36 remains substantially in a cylindrical shape and thereby functions as a force transmitting member which distributes the applied force to an annular section of the top wall 42. This working force progressively moves the actuating portion 48 downwardly toward the base wall 37 reducing the volume of the fluid chamber 52 thereby moving the fluid therein out through the passage 54.

The top edge 43 of the wall 41 cooperates with the top wall section 44 to produce a uniform annularly disposed bending action which resists deformation of the top wall 42 and by virtue of its inherent resiliency or flexibility operates to move the top wall upwardly away from the bottom wall 37 when the foot 36 is removed from the actuating portion 48.

When the top wall 42 moves away from the base wall 37 the volume of the fluid chamber 52 increases with a consequent reduction of pressure therein whereby fluid from the reservoir 16 is drawn into the pump 20. This action increases the speed of the operation of the pump because the pump is quickly replenished with a normal supply of washing fluid. In other words, the pump can be repeatedly operated to intermittently dispense washing fluid on the windshield of the vehicle.

Although the invention has been described with respect to a preferred embodiment, it will be understood that it is not to be so limited since changes can be made therein which are within the full intended scope of this invention as defined in the appended claims.

I claim:
1. A unitary pump comprising:
   (a) a flat base wall,
   (b) an annular side wall integrally formed with and extended upwardly from said base wall, said side wall having a single hole,
   (c) a plurality of projections integral with and extended laterally from said base wall, each projection having at least one hole for receiving means operable to secure the pump to a support,
   (d) tube means integrally formed with said base wall and side wall and projected laterally from said side wall, said tube means having a single passage communicating with the single hole in said side wall,
   (e) a flexible upwardly convex-shaped top wall integrally formed with said side wall and having a central opening therein, and
   (f) an inverted cup-shaped knob having side walls extended substantially normal to said base wall and integrally joined with the top wall adjacent the opening therein.

2. A unitary pump comprising:
   (a) a flat base wall,
   (b) an annular side wall integrally formed with and extended upwardly from said base wall, said side wall having a single hole,
   (c) tube means integrally formed with said base wall and side wall and projected laterally from said side wall, said tube means having a single passage communicating with the single hole in said side wall,
   (d) a flexible upwardly convex-shaped top wall integrally formed with said side wall and having a central opening therein, said annular side wall and top wall progressively decreasing in thickness toward the central opening in the top wall, and
   (e) an inverted cup-shaped knob having side walls extended substantially normal to said base wall and integrally joined with the top wall adjacent the opening therein.

References Cited in the file of this patent

UNITED STATES PATENTS

| | | |
|---|---|---|
| 2,717,556 | Bartoo | Sept. 13, 1955 |
| 2,834,296 | Neufeld et al. | May 13, 1958 |
| 2,898,644 | Kelley et al. | Aug. 11, 1959 |
| 2,914,256 | O'Shei | Nov. 24, 1959 |
| 2,962,223 | Partridge | Nov. 29, 1960 |

FOREIGN PATENTS

| | | |
|---|---|---|
| 849,416 | Great Britain | Sept. 28, 1960 |